Oct. 14, 1969 S. JURA 3,472,436
LOW FRICTION DATA TAPE UNIT
Filed Oct. 25, 1967 4 Sheets-Sheet 1

INVENTOR:
Stanislav JURA
by: Arthur O. Klein
his Attorney

INVENTOR:
Stanislav JURA
by: Arthur O. Klein
his Attorney

INVENTOR:
Stanislav JURA
by: Arthur O. Klein
his Attorney

INVENTOR:
Stanislav JURA
by: Arthur O. Klein
his Attorney

United States Patent Office 3,472,436

Patented Oct. 14, 1969

3,472,436

LOW FRICTION DATA TAPE UNIT

Stanislav Jura, Prague, Czechoslovakia, assignor to Vyzkumny ustav matematickych stroju, Prague, Czechoslovakia, a corporation Filed Oct. 25, 1967, Ser. No. 678,025
Int. Cl. B65h 17/32, 17/42
U.S. Cl. 226—50 18 Claims

ABSTRACT OF THE DISCLOSURE

A data storage unit is provided with a pneumatic drive nozzle for moving an information-bearing tape in a predetermined path past a read-out head. The moving tape is frictionlessly supported on air air cushion at one or more spaced points, and is collected and stored in the form of stacks of cushioned folds in a reservoir disposed in the path.

BACKGROUND OF THE INVENTION

In applicant's co-opending application Ser. No. 598,758, filed Dec. 2, 1966, there is described a pneumatic nozzle which receives and drives information bearing tape by impinging streams of air obliquely on opposite surfaces of the tape. No physical contact exists between the tape and the adjacent walls of the nozzle, so that exceptionally high tape speeds and long tape life are permitted.

Such nozzles may be employed as drive elements in existing data tape units, wherein a tape stored in a cartridge is moved past a read-out head in a guided path defined by a suitable support structure. Unfortunately the high-speed capability of such nozzles cannot at present be fully realized in such units, since friction caused by the support structure and the cartridge physically places a drag on the moving tape. This friction, in addition to preventing high tape speed, may cause severe physical damage to the tape.

SUMMARY OF THE INVENTION

In one illustrative embodiment of the invention, a data tape storage unit employing the pneumatic nozzle described in the above-mentioned co-pending application is provided with an essentially frictionless support arrangement for the moving tape. A reservoir disposed in the path stores the tape in the form of a stack of loose cushioned folds, so that one side of the moving tape enters the reservoir and comes to rest on one side of the stack while the other side of the tape is simultaneously pulled from the other side of the stack and exits through the reservoir. The tape is guided in its predetermined path through the reservoir, nozzle, and read-out head by means of an effective air cushion established by projecting a stream of pressurized air outwardly through apertures in a hollow support cylinder.

A plurality of the tapes may be arranged in separate parallel paths around a common hollow support cylinder to form a composite data unit. Each tape has its own drive nozzle, read-out head, and reservoir.

If desired, the reservoir may be eliminated so that the tape defines a band stretched between and frictionlessly supported by air cushions established by a pair of spaced hollow cylinders.

BRIEF DESCRIPTION OF THE DRAWING

The nature of the invention and its advantages are set forth more fully in the following detailed description taken in conjunction with the appended drawing, in which.

DETAILED DESCRIPTION

Figure 1:
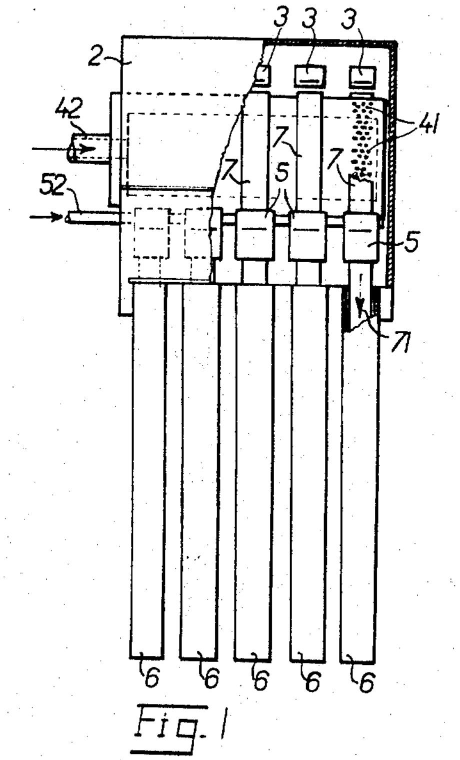
FIG. 1 is a front elevation, partially broken away, of a five-tape data unit constructed in accordance with the invention.

Referring now to the drawing, FIG. 1 illustrates a multi-tape data storage and read-out unit 1 constructed in accordance with the invention. The unit 1 is arranged to individually move a plurality of information-bearing tapes 7—7 in parallel vertical paths. Each path progresses around a common support cylinder 4 (FIG. 2) and past an associated floating read-out head 3 disposed above the cylinder 4. For purposes of this description an "information-bearing tape" may include a punched paper tape, magnetic tape, electrostatic band or similar arrangement.

Figure 3:
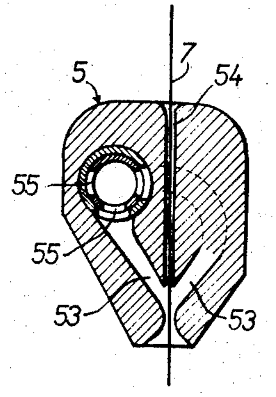
FIG. 3 is a longitudinal section of a tape-driving nozzle employed in the unit of FIGS. 1–2.

As shown best in FIG. 3, each tape 7 is received in and driven through its path by a separate pneumatic drive nozzle 5, which may be constructed in the manner described and claimed in the above-mentioned co-pending application. Specifically, the drive nozzle 5 includes a longitudinal slot 54 through which the tape 7 is threaded. A pair of tapered air channels 53—53, each of which may be arranged in the approximate shape of a Laval's mouthpiece, are symmetrically disposed on opposite sides of the slot 54 and converge thereon at acute angles to the plane of the tape 7. The channels 53 open up into the slot 54 at a location corresponding to the plane of their narrowest cross-section. The channels 53 are supplied by a common inlet 55 with pressurized air from a suitable source (not shown). The nozzle 5 may be continuously supplied with air in this manner, in which case the received tape will be constantly in motion. Alternatively, suitable means may be provided for feeding air intermittently, as on command of an external control circuit (not shown).

With the arrangement of the nozzle 5, no significant component of air flow can exist within the nozzle in a direction perpendicular to the tape 7. Thus the tape essentially moves through the nozzle without contacting its wall. The resulting absence of friction permits high tape speeds (e.g., 70 feet per second and more) without danger of damage to the tape. The tape speed may be controlled by regulating the air velocity into the inlet 55.

Each nozzle 5 drives the associated tape 7 in the direction of an arrow 71 (FIG. 2) and into an interior space 63 of a reservoir 6 via a first opening 61 thereof. The tape is collected and stored in the reservoir 6 in the manner described below, and exits therefrom in the direction of an arrow 70 via a second opening 62. The tape then passes around the support cylinder 4, below the readout head 3, and into the drive nozzle 5 to complete a closed loop. For purposes of protection and also to permit access to the internal parts shown, the unit 1 may be provided with a removable cover 2.

Figure 4:
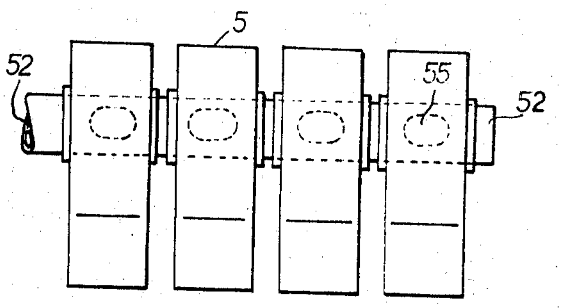
FIG. 4 is an enlarged longitudinal view of the nozzles employed to drive the respective tapes of the unit of FIGS. 1–2, all the nozzles being provided with air from a common source.

As shown in FIG. 4, air may be introduced into the inlets 55 of all of the nozzles 5 of the unit 1 by means of a suitably apertured common inlet pipe 52. The pipe 52 passes perpendicularly through each inlet 55 and communicates with the channels 53 (FIG. 3) in each nozzle by means of aligned openings in the inlet 55 and the pipe 52.

Referring again to FIG. 2, each nozzle is pivotally mounted adjacent the opening 61 of its associated reservoir 6 and is supported on the pipe 52 which may pass perpendicularly through all of the nozzles in the manner shown in FIG. 4. This mounting arrangement permits movement of the nozzle 5 (FIG. 2) between first and second position spaced 90° apart. In the operative position shown in FIG. 2, for instance, each nozzle is oriented toward the adjacent reservoir opening 61. Alternatively, and in order to thread the tape through the nozzle 5 or remove it therefrom, the nozzle may be pivoted 90° in a clockwise direction from the position shown in FIG. 2 into alignment with an access hole 11 in the wall of the body 1.

In accordance with the invention, the above-mentioned advantages of the drive nozzle 5 in each tape path may be fully exploited by assuring minimum friction during the tape movement through the reservoir 6 and over the support cylinder 4. This is accomplished, in the embodiment of FIG. 2, by collecting and storing the tape in the reservoir 6 in the form of a stack of loose folds or loops 72, as opposed to the tightly wound coils employed in reel-type data units. The loops 72 form a frictionless cushion for the tape. Thus, tape moved into the reservoir 6 by the nozzle 5 in the direction of the arrow 71 comes to rest against one end of the loop stack. Simultaneously, tape already at rest is withdrawn by the nozzle from the other end of the stack and pulled upwardly out of the reservoir through the opening 62 and over the cylinder 4. Thus, the "passage" of the tape through the reservoir is accomplished with very little friction.

Figure 2:
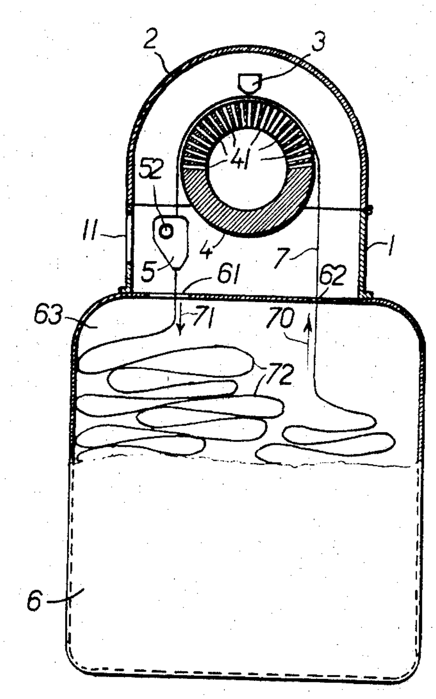
FIG. 2 is a sectional side elevation of the data unit of FIG. 1, showing details of an associated reservoir and support cylinder.

In order to further minimize friction of the tape when the latter is passing over the support cylinder 4, the latter is made hollow as shown in FIG. 2. A plurality of radial passages 41 extend inwardly through the annular wall of the cylinder from the outer periphery thereof and communicate with the interior of the cylinder. Pressurized air may be introduced to the interior of the cylinder by means of a pipe 42 (FIG. 1). This pressurized air exits from the cylinder 4 through the radial passages 41 and impinges on the adjacent tape thereby holding the latter out of contact with the periphery of the cylinder and effectively supporting the moving tape on a low-friction air cushion.

Many modifications of the particular arrangements shown in FIGS. 1–4 are possible. For example, while the several tapes in FIG. 1 are shown to be air-supported by underlying passages 41 in a common cylinder 4, it will be apparent that separate support cylinders may be provided in each tape path. Also, it will be appreciated that a common read-out head 3 capable of accommodating a plurality of tapes simultaneously may be substituted for the separate floating heads shown.

In general, only the information recorded on one side of the tape 7 may be read out by the arrangement of FIGS. 1–4. However, if the closed loop is formed by twisting one end of tape 180° with respect to the other end and then joining the ends to form the loop, information entered on both sides of the tape may be read out during successive traversals of the tape over the path.

Figure 5:
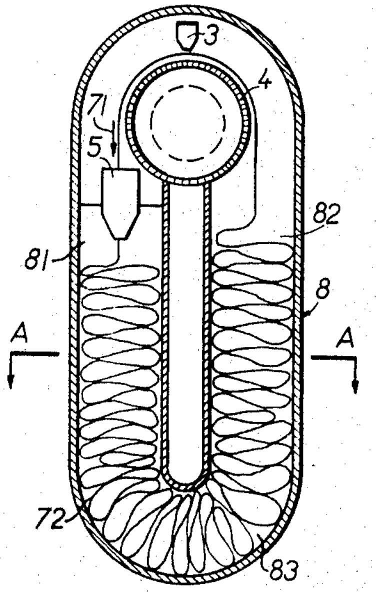
FIG. 5 is a sectional side elevation, similar to FIG. 2, but depicting a data unit having a reservoir defined by a U-shaped trough.
Figures 5A, 6:
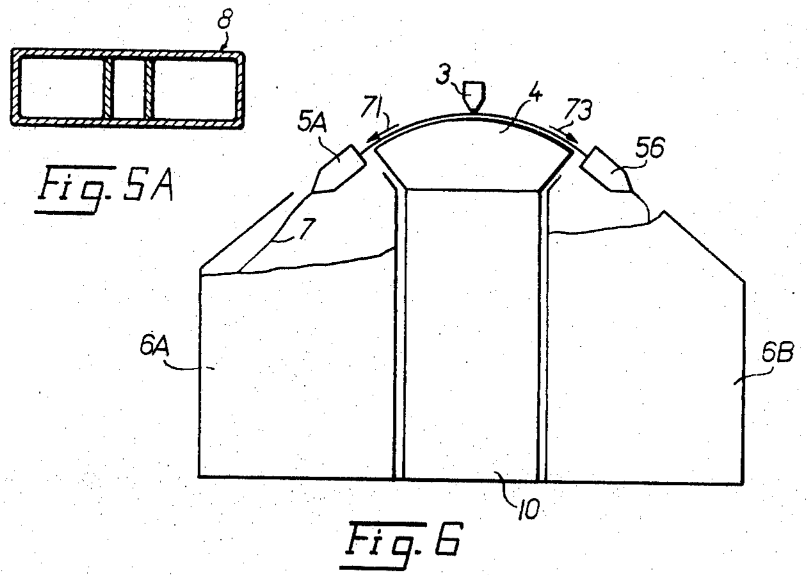
FIG. 5A is a plan section through the U-shaped trough of FIG. 5.
FIG. 6 is a side view of a data unit constructed in accordance with the invention and provided with a pair of drive nozzles for moving tape in a selected one of two opposite directions.

The embodiment shown in FIGS. 5 and 5A is similar to that of FIGS. 1–4 except that the reservoir is in the form of a U-shaped trough 8 of constant, generally rectangular cross-section. The trough includes an input left-hand section 81 and an output right-hand section 82 joined by an interconnecting portion 83. The nozzle 5 protrudes part way into the section 81 and terminates near the adjacent end of the stack of tape loops 72 in the reservoir. In this embodiment, the movement of the tape by the nozzle in the direction of the arrow 71 is enhanced by two additional factors: (a) the movement of the tape by gravity action from the input section 81 to the output section 82, which action helps to maintain the tape in the form of the loops shown; and (b) the pressure of the driving air stream emanating from the bottom of the nozzle 5 and incident on the adjacent end of the stack of loops 72.

In the previous description, it has been assumed that only one nozzle is provided in each tape path for the purpose of driving tape in a single direction. A variation of this arrangement is shown in FIG. 6, wherein a tape 7 is passed through a pair of spaced, oppositely oriented nozzles 5A and 5B, each of which may be identical to the nozzle 5 of FIG. 3. The nozzles 5A and 5B are disposed on opposite sides of a base 10 on which the hollow support body 4 is mounted. The body 4, which in this embodiment is in the form of a bridge, is assumed to be provided with radial passages (not shown) for establishing an air cushion for the overlying tape in the same manner as the cylinder of FIGS. 1–4.

Figure 7:
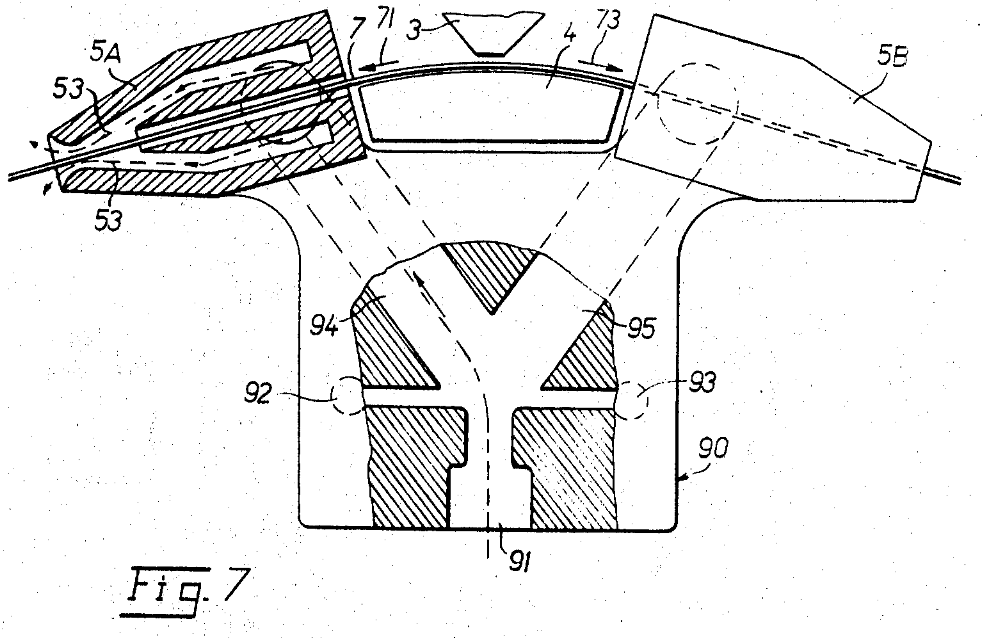
FIG. 7 is a longitudinal view of a first form of bi-stable pneumatic valve suitable for selectively driving the oppositely-directed nozzles of FIG. 6.
Figure 8:
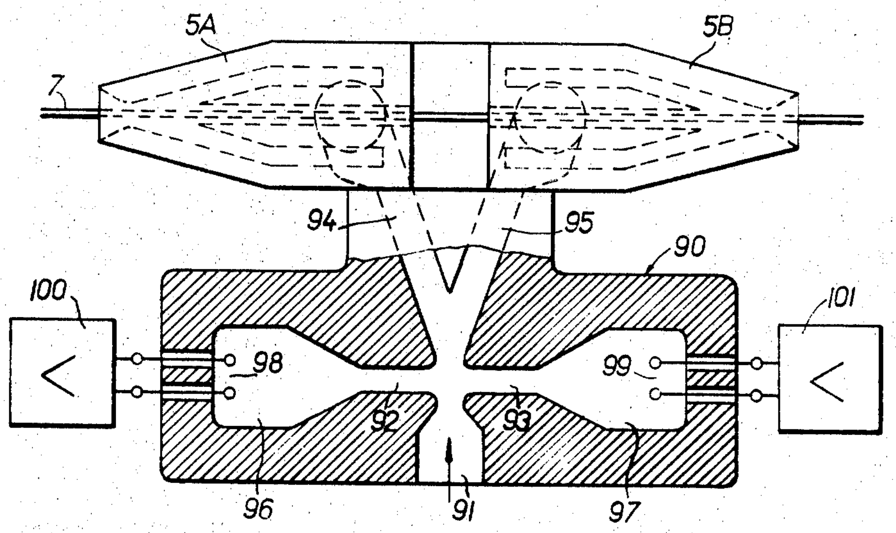
FIG. 8 is a longitudinal view of a second form of bi-stable pneumatic valve suitable for selectively driving the oppositely-directed nozzles of FIG. 6.

The nozzle 5A (FIG. 6) is oriented to drive the tape in the direction of the arrow 71 and into a first reservoir 6A. The nozzle 5B is oriented to drive the tape in the direction of the arrow 73 and into a second reservoir 6B. For this purpose, the nozzles may be selectively supplied with air by means of a bi-stable pneumatic valve 90 (FIG. 7). The valve 90 selectively moves the tape to the left or right, as viewed in the figure. The tape direction may be chosen according to some external criterion (e.g., the direction that can most rapidly bring a predetermined portion of the tape to a point opposite the read-out head 3). The valve 90 may take the form of a "fluidistor," wherein pressurized air is applied to a common inlet 91 from a suitable source (not shown) and routed to a selected one of a pair of supply channels 94 and 95. The channels 94 and 95 are respectively in communication with the inlets of the oppositely directed nozzles 5A and 5B. As is well known, air may be routed through the valve 90 to one or the other of the channels 94 and 95 by means of a pulse of air current applied to a selected one of a pair of control channels 92 and 93. Alternatively, as shown in FIG. 8, the valve 90 may take the form of an electro-pneumatic converter of any suitable type, which is functionally similar to the valve of FIG. 7 except that the routing of air from the input 91 to one of the channels 94 and 95 is achieved by establishing pressure waves in a corresponding one of the channels 92 and 93. Such pressure waves may be produced by electrical spark gaps 98 and 99, respectively. The gap 98 is defined by a pair of electrical contacts terminating an electrical source 100 and located in an opening 96, which is in communication with the control channel 92. Similarly, the gap 99 is defined by a pair of contacts terminating an electrical source 101 and located in an opening 97, which is in communication with the control channel 93.

Figure 9:
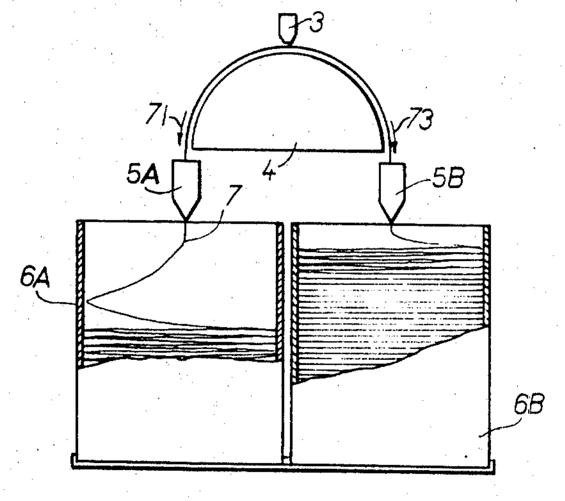
FIG. 9 is a side elevation, similar to FIG. 6, wherein the oppositely-directed drive nozzles are respectively oriented to urge tape into adjacent reservoirs to increase the capacity of the latter.

FIG. 9 shows a variation of the tape unit of FIG. 6 wherein the reservoirs 6A and 6B associated with the nozzles 5A and 5B may contain pre-folded tape. The respective nozzles 5A and 5B are so oriented that, when one of them is excited by the valve 90 of FIGS. 7 and 8 to move the tape into the associated reservoir, the resulting stream of air from the driven nozzle serves to compress the tape in zig-zag fashion in the adjacent reservoir. This compression serves to increase the capacity of the reservoir.

Figures 10, 11, 12:
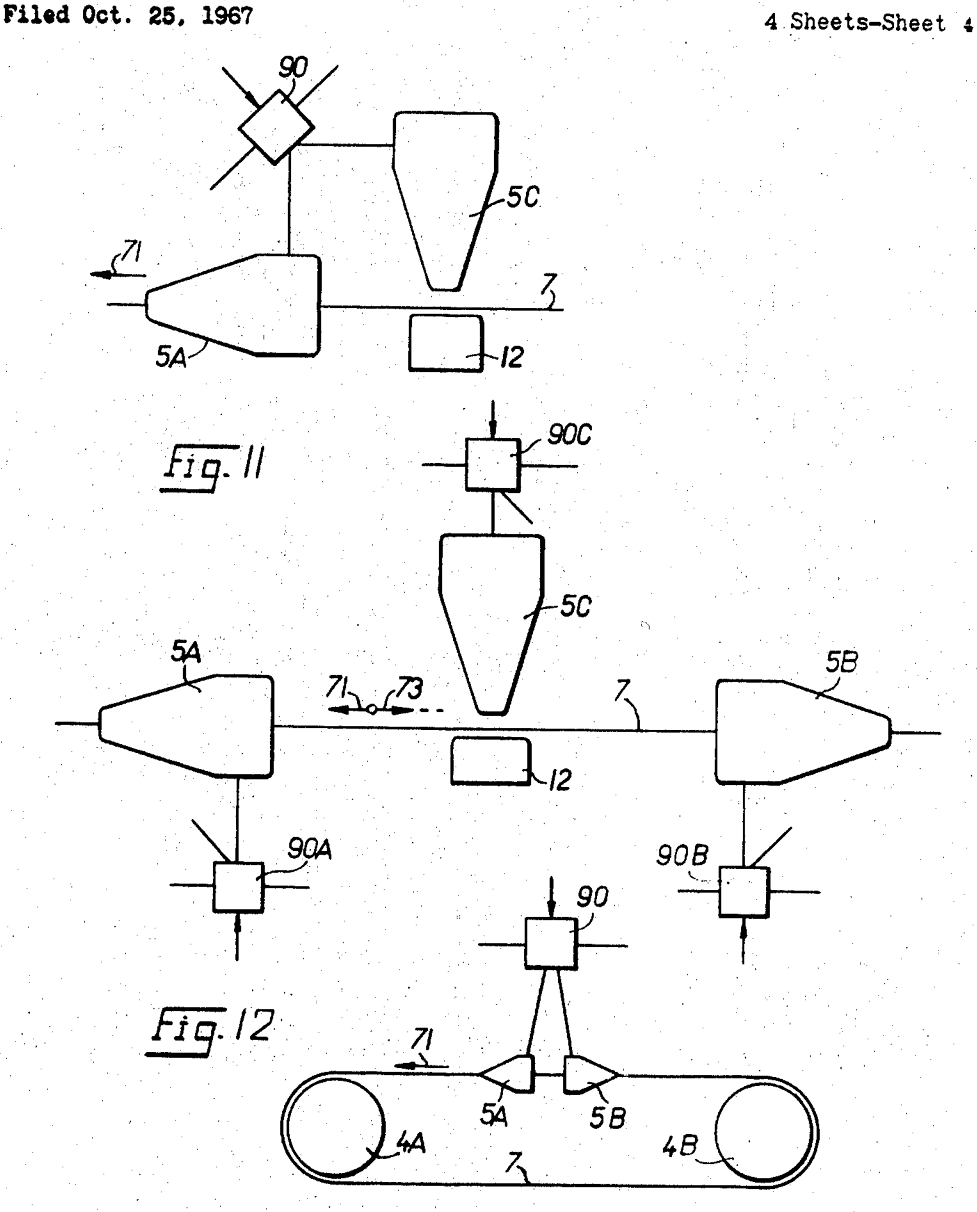
FIG. 10 is a diagrammatic view of a data tape unit, functionally similar to FIGS. 6 and 9, but employing a pair of frictionless support cylinders to guide a band of the tape in a closed path.
FIG. 11 depicts schematically a pair of nozzles for selectively moving and stopping a tape.
FIG. 12 depicts schematically an arrangement of three nozzles for selectively moving the tape in one of two opposite directions and bringing it to rest.

FIG. 10 illustrates schematically a data unit functionally similar to that of FIGS. 6 or 9, but operative without a reservoir. In FIG. 10, a closed band of tape 7 is stretched between and supported on air cushions established by a pair of spaced hollow support cylinders 4A and 4B in the manner described above. As shown, the tape 7 is driven in a selected one of two opposite directions by the drive nozzles 5A and 5B under the control of the bi-stable pneumatic valve 90. It will be understood that if uni-directional tape operation is desired (e.g., in the direction of the arrow 71 only), the nozzle 5A may be used to drive the tape while the nozzle 5B may be employed to control its velocity.

FIG. 11 illustrates a pair of pneumatic nozzles 5A and 5C, each of which may be similar to the nozzle 5 of FIG. 3. The arrangement is such that under the control of the valve 90, the nozzle 5A may be employed to drive the tape in the direction of the arrow 71 while the nozzle 5C may be employed to brake the tape. In this way a predetermined portion of the tape may be brought to rest opposite a suitable read-out head (not shown). To accomplish this, the tape is routed through the drive nozzle 5A and between a base surface 12 and the braking nozzle 5C. The latter is spaced from and oriented perpendicular to the tape opposite the base member 12. If it is desired to drive the tape, the valve 90 applies air to the nozzle 5A. If it is desired to brake the tape, the valve control is suitably switched, and air is supplied to the nozzle 5C. The latter directs this air perpendicularly against the tape 7, and urges it into frictional engagement with the base member 12 to stop the tape.

FIG. 12 shows an alternative manner of utilizing the braking nozzle 5C and the associated base member 12. In this case, these components are disposed intermediate a pair of oppositely directed drive nozzles 5A and 5B. The latter nozzles may be selectively driven to move the tape 7 in one of two opposite directions represented by the arrows 71 and 73, and the nozzle 5C may be driven to brake the tape. As shown, separate bi-stable valves 90A, 90B and 90C may individually control the nozzles 5A, 5B and 5C. Alternatively, it will be apparent that the three nozzles may be controlled by a common three-state pneumatic valve of a suitable design.

In the foregoing, the invention has been described in connection with preferred arrangements thereof.

What is claimed is:

1. In a data unit wherein an information bearing tape may be moved in a predetermined path past a suitable read-out head, the improvement which comprises:
- at least one nozzle disposed in the predetermined path, the nozzle having a longitudinal slot for receiving the tape therethrough, a pair of tapered channels symmetrically and obliquely converging on and communicating with the slot from opposite sides thereof, and an inlet communicating with both channels and connectable to a pressure medium for moving the tape through the nozzle and along the path;
- non-contacting tape support means for guiding the tape in spaced relation thereto along the path; and
- means disposed in the path for storing the tape in the form of a stack of cushioned loops.

2. In a data unit wherein an information-bearing tape may be moved in a predetermined path past a suitable read-out head, the improvement which comprises:

- at least one nozzle disposed in the predetermined path, the nozzle having a longitudinal slot for receiving the tape therethrough, a pair of tapered channels symmetrically and obliquely converging on and communicating with the slot from opposite sides thereof, and an inlet communicating with both channels and connectable to a pressure medium for moving the tape through the nozzle and along the path; and
- means disposed in the path for storing the tape in the form of a stack of cushioned loops.

3. In a data unit wherein an information-bearing tape may be moved in a predetermined path past a suitable read-out head, the improvement which comprises:
- at least one nozzle disposed in the predetermined path, the nozzle having a longitudinal slot for receiving the tape therethrough, a pair of tapered channels symmertically and obliquely converging on and communicating with the slot from opposite sides thereof, and an inlet communicating with both channels and connectable to a pressure medium for moving the tape through the nozzle and along the path; and
- non-contacting tape support means for guiding the tape in spaced relation thereto along the path.

4. A unit as defined in claim 1, wherein the tape forms a closed loop.

5. A unit as defined in claim 2, wherein the nozzle is mounted adjacent the storing means and oriented in the direction of the storing means.

6. A unit as defined in claim 2, in which the storing means defines a U-shaped reservoir of substantially constant, generally rectangular cross-section.

7. A unit as defined in claim 3, further comprising means for pivotally mounting the nozzle so that the nozzle may be oriented in a selected one of two mutually perpendicular directions.

8. A unit as defined in claim 3, in which the guiding means comprises at least one hollow body having a plurality of passages extending from its periphery to the interior thereof, and the unit further comprises means for introducing a pressurized medium into the interior of the hollow body.

9. A unit as defined in claim 8, in which the hollow body comprises a cylinder.

10. A unit as defined in claim 8, in which the tape defines a closed loop and in which a pair of the hollow bodies are provided at opposed locations in the predetermined path for guiding the tape.

11. A unit as defined in claim 8, in which a plurality of the predetermined paths extend in parallel planes around axially spaced portions of the cylinder.

12. A unit as defined in claim 11, further comprising common means for supplying the pressurized medium to the nozzles associated with all of the paths.

13. A unit as defined in claim 3, wherein a first and a second one of the nozzles are disposed in spaced relation, and the unit further comprises a bi-stable pneumatic valve for directing the pressurized medium into a selected one of the nozzles.

14. A unit as defined in claim 13, in which the valve comprises an inlet connectable with the pressurized medium, a pair of outlet passages individually communicating with the inlets on the first and second nozzles, and means for directing the pressurized medium from the inlet of the valve to a selected one of the outlet passages.

15. A unit as defined in claim 13, in which the first nozzle is disposed in the predetermined path for driving the tape, and the second nozzle is spaced from the path on one side of the tape for directing a stream of the pressurized medium against the tape.

16. A unit as defined in claim 15, further comprising a base member disposed on the opposite side of the tape, the pressurized medium from the second nozzle urging the tape against the base member.

17. A unit as defined in claim 13, in which the first and second nozzles are each disposed in the predetermined path and oriented to respectively move the tape in opposite directions.

18. A unit as defined in claim 17, further comprising a base member disposed intermediate the first and second nozzles and on one side of the tape, and a third nozzle aligned with the base member and disposed on the opposite side of the tape for directing the pressurized medium prependicularly against the tape to urge the latter against the base member.

References Cited

UNITED STATES PATENTS 2,883,475 4/1959 Ridler et al. -------- 226—97 X

FOREIGN PATENTS 67,481 10/1957 France.

ALLEN N. KNOWLES, Primary Examiner

U.S. Cl. X.R.

226—97, 108, 119